(12) United States Patent
Endo et al.

(10) Patent No.: US 7,851,583 B2
(45) Date of Patent: *Dec. 14, 2010

(54) PROCESS AND ACTIVATED CARBON CATALYST FOR RING-OPENING POLYMERIZATION

(75) Inventors: Toshio Endo, Ohtake (JP); Tetsuro Taguchi, Yao (JP); Keiji Fujiyoshi, Yao (JP)

(73) Assignees: Daicel Chemical Industries, Ltd., Osaka (JP); Hokoku Corporation, Osaka (JP)

( * ) Notice: Subject to any disclaimer, the term of this patent is extended or adjusted under 35 U.S.C. 154(b) by 426 days.

This patent is subject to a terminal disclaimer.

(21) Appl. No.: 11/795,803

(22) PCT Filed: Feb. 3, 2006

(86) PCT No.: PCT/JP2006/301853

§ 371 (c)(1),
(2), (4) Date: Jul. 23, 2007

(87) PCT Pub. No.: WO2006/085485

PCT Pub. Date: Aug. 17, 2006

(65) Prior Publication Data

US 2008/0161533 A1    Jul. 3, 2008

(30) Foreign Application Priority Data

Feb. 10, 2005    (JP) .............................. 2005-034764

(51) Int. Cl.
*B01J 21/18* (2006.01)
*C08G 65/22* (2006.01)

(52) U.S. Cl. ........................ 528/408; 528/421; 502/180

(58) Field of Classification Search ................. 528/408, 528/421; 502/180
See application file for complete search history.

(56) References Cited

U.S. PATENT DOCUMENTS

| 3,250,807 A | 5/1966 | Fritz et al. |
| 3,370,056 A | 2/1968 | Kobe et al. |
| 4,769,184 A * | 9/1988 | Okabe et al. ................. 562/849 |
| 5,010,187 A * | 4/1991 | Heuvelsland ................ 536/120 |
| 5,798,412 A * | 8/1998 | Sanderson et al. ........... 524/847 |
| 5,952,457 A * | 9/1999 | Kouno et al. ................. 528/408 |

FOREIGN PATENT DOCUMENTS

| EP | 0 978 316 A1 | 2/2000 |
| GB | 1038365 A | 8/1966 |
| JP | 60-136536 A | 7/1985 |
| JP | 1-49340 B2 | 10/1989 |
| JP | 2002-30144 | 1/2002 |
| JP | 2002-30144 A | 1/2002 |

* cited by examiner

*Primary Examiner*—Randy Gulakowski
*Assistant Examiner*—Rachel Kahn
(74) *Attorney, Agent, or Firm*—Birch, Stewart, Kolasch & Birch, LLP

(57) ABSTRACT

An oxirane compound of following Formula (1), such as glycidol, is reacted in the presence of a powdered activated carbon, where necessary, with an initiator such as a polyhydric alcohol, an aliphatic alcohol, or an aliphatic carboxylic acid, to yield, for example, a polyglycidol, a polyglycidol alkyl ether, or a polyglycidol alkyl ester.

[Chemical Formula 1]

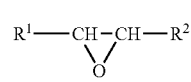

(1)

wherein $R^1$ and $R^2$ may be the same as or different from each other and each represent one selected from hydrogen (H); a branched- or straight-chain alkyl group having one to thirty carbon atoms or an aryl group; and a functional group represented by —$CH_2$-M, wherein M represents OH, F, Cl, Br, or —$OR^3$, wherein $R^3$ represents an alkyl group having one to twenty carbon atoms, allyl group, or an aryl group.

A target compound can be obtained in a high yield with high quality according to this invention, from which the catalyst can be easily separated.

5 Claims, No Drawings

PROCESS AND ACTIVATED CARBON CATALYST FOR RING-OPENING POLYMERIZATION

TECHNICAL FIELD

The present invention relates to a process for ring-opening polymerization using an activated carbon as a catalyst, and a catalyst for ring-opening polymerization.

BACKGROUND ART

Ring-opening polymerization is a polymerization process in which polymerization proceeds as a result of ring opening of a cyclic compound as a monomer to synthetically yield a polymer. Industrially important synthetic polymers such as nylons (polyamides), polyesters, polyethers, polyethyleneimines, and polysiloxanes are now produced through ring-opening polymerization.

In general, a catalyst must be added to a reaction system so as to develop ring-opening polymerization. The catalyst herein acts upon the cyclic compound and accelerates its ring-opening reaction. For example, catalysts for cation-reactive monomers such as cyclic ethers, cyclic formals, and cyclic imines include Lewis acids such as $BF_3 \cdot O(C_2H_5)_2$, $SnCl_4$, and $AlCl_3$; alkyl halides such as alkyl chlorides and alkyl bromides; super strong acids such as $CF_3SO_3H$; esters of super strong acids, such as $CF_3SO_3R$, wherein R represents an alkyl group; and cation salts such as $R_3C^+PF_6^-$ and $R_3O+BF_4^-$, wherein R represents an alkyl group. Catalysts for anion-reactive monomers such as cyclic siloxanes, lactams, and acid anhydrides include Li, Na, K, RCOONa, RONa, and $R_2NLi$, wherein R represents an alkyl group. As a catalyst for a fluorooxetane, there is disclosed an alkali metal fluoride supported on a support such as an activated carbon. In this catalyst, however, the active site is the alkali metal fluoride, and the activated carbon only plays a role as a support (Patent Document 1). Catalysts for coordinate anion-reactive monomers such as cyclic ethers and lactones include, for example, $(C_2H_5)_2Zn$—$H_2O$, $(C_2H_5)_2Zn$—ROH, and $AlR_3$-acetylacetone-$H_2O$, wherein R represents an alkyl group; and those for metathesis reactive monomers such as cyclic olefins include $MoCl_5$ and $WCl_6$.

However, when these known catalysts are used, 1) side reactions other than polymerization may occur, and/or 2) residual catalysts, if remained in the resulting polymers, may exhibit some toxicity or may cause deterioration in performance of the polymers.

In contrast, activated carbons have been known to be used as adsorbents and supports for solid catalysts but have not yet been known to be usable, if used alone, as catalysts for ring-opening polymerization.

Patent Document 1: Japanese Examined Patent Application Publication No. 1-49340 (Claim 5)

DISCLOSURE OF INVENTION

Problems to be Solved by the Invention

Accordingly, an object of the present invention is to provide a process for ring-opening polymerization using a catalyst that has an excellent catalytic activity, does not cause side reactions, is separated from a produced polymer through filtration, thereby does not remain in the polymer, and does not cause deterioration in safety and performance of the polymer. Another object of the present invention is to provide a catalyst for use in the polymerization process.

Means for Solving the Problems

After intensive investigation, the present inventors found that the above objects are achieved by using an activated carbon as a catalyst in ring-opening polymerization. The present invention has been made based on these findings.

Specifically, according to a first embodiment of the present invention, there is provided a process for ring-opening polymerization that proceeds through ring opening of at least one cyclic compound (A) as a monomer. This process includes the step of using an activated carbon as a catalyst.

According to a second embodiment of the present invention, there is provided a process for ring-opening polymerization according to the first embodiment, in which the activated carbon includes a powdered activated carbon.

There is also provided, according to a third embodiment of the present invention, a process for ring-opening polymerization according to the first embodiment, in which the ring-opening polymerization is ring-opening homopolymerization of one cyclic compound (A) or ring-opening copolymerization of two or more different cyclic compounds (A).

There is further provided, according to a fourth embodiment of the present invention, a process for ring-opening polymerization according to any one of the first, second, and third embodiments, in which the cyclic compound (A) includes an oxirane compound (a) represented by following General Formula (1):

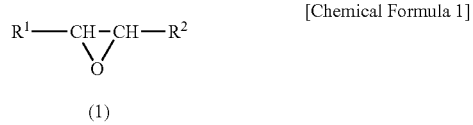

[Chemical Formula 1]

(1)

wherein $R^1$ and $R^2$ may be the same as or different from each other and each represent one selected from the group consisting of hydrogen (H); a branched- or straight-chain alkyl group having one to thirty carbon atoms or an aryl group; and a functional group represented by —$CH_2$-M, wherein M represents OH, F, Cl, Br, or —$OR^3$, wherein $R^3$ represents an alkyl group having one to twenty carbon atoms, allyl group, or an aryl group.

According to a fifth embodiment of the present invention, there is provided a process for ring-opening polymerization according to the fourth embodiment, in which the oxirane compound (a) is at least one selected from the group consisting of ethylene oxide, propylene oxide, butylene oxide, an α-olefin epoxide having six to thirty carbon atoms, styrene oxide, glycidol, and epichlorohydrin.

According to a sixth embodiment of the present invention, there is provided a process for ring-opening polymerization according to the fifth embodiment, in which the oxirane compound (a) is glycidol.

According to a seventh embodiment of the present invention, there is provided a process for ring-opening polymerization according to the sixth embodiment, in which a reaction of glycidol is carried out using an active hydrogen-containing compound (b) as an initiator.

According to an eighth embodiment of the present invention, there is provided a process for ring-opening polymerization according to the seventh embodiment, in which water or a polyhydroxy compound is used as the active hydrogen-containing compound (b) to yield a polyglycidol.

According to a ninth embodiment of the present invention, there is provided a process for ring-opening polymerization according to the seventh embodiment, in which an aliphatic alcohol is used as the active hydrogen-containing compound (b) to yield a polyglycidol aliphatic alkyl ether.

According to a tenth embodiment of the present invention, there is provided a process for ring-opening polymerization according to the seventh embodiment, in which an aliphatic carboxylic acid is used as the active hydrogen-containing compound (b) to yield a polyglycidol aliphatic carboxylic acid ester.

There is also provided, according to an eleventh embodiment of the present invention, a catalyst for ring-opening polymerization, which includes any one of:

(1) an activated carbon alone;

(2) a support and a powdered activated carbon supported on the support;

(3) a granulated article of a powdered activated carbon; and (4) a granulated article of a powdered activated carbon with another powdered material.

In addition, there is provided, according to a twelfth embodiment of the present invention, a catalyst for ring-opening polymerization according to the eleventh embodiment, for use in ring-opening polymerization of oxirane compounds.

ADVANTAGES

According to the present invention, there is provided a process for ring-opening polymerization which uses an activated carbon as a catalyst. In this process, the activated carbon as the catalyst has an excellent catalytic activity, does not cause side reactions, is separated from a produced polymer through filtration, thereby does not remain in the polymer, and does not cause deterioration in safety and performance of the polymer. According to the present invention, there is also provided an activated carbon for use in the polymerization process.

BEST MODE FOR CARRYING OUT THE INVENTION

[Cyclic Compound (A)]

Cyclic compounds (A) used as monomers are not specifically limited, as long as they can undergo ring-opening polymerization in the presence of an activated carbon catalyst. Examples of cyclic compounds (A) usable in the present invention include oxiranes (a) represented by following General Formula (1):

[Chemical Formula 2]

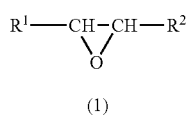

(1)

wherein $R^1$ and $R^2$ may be the same as or different from each other and each represent one selected from the group consisting of hydrogen (H); a branched- or straight-chain alkyl group having one to thirty carbon atoms or an aryl group; and a functional group represented by —$CH_2$-M, wherein M represents OH, F, Cl, Br, or —$OR^3$, wherein $R^3$ represents an alkyl group having one to twenty carbon atoms, allyl group, or an aryl group.

Preferred examples of oxirane compounds (a) include compounds of General Formula (1), in which $R^1$ and $R^2$ are hydrogens; and compounds of General Formula (1), in which $R^1$ is hydrogen and $R^2$ is one of a branched- or straight-chain alkyl group having one to thirty carbon atoms, an aryl group, and a group represented by —$CH_2$-M, wherein M represents OH, F, Cl, Br, —$OR^3$, wherein $R^3$ represents an alkyl group having one to twenty carbon atoms, allyl group, or an aryl group. Specific examples thereof include ethylene oxide, propylene oxide, butylene oxide, an α-olefin epoxide having six to thirty carbon atoms, styrene oxide, glycidol, and epichlorohydrin.

In the present invention, the term "ring-opening homopolymerization" refers to ring-opening polymerization of one cyclic compound (A), and the term "ring-opening copolymerization" refers to ring-opening polymerization of two or more different cyclic compounds (A).

[Activated Carbon]

Activated carbons for use as catalysts in the present invention can be articles known as porous carbonaceous absorbents. These activated carbons can be prepared by carbonizing carbonaceous materials through heat treatment, and activating the carbonized materials. Examples of such carbonaceous materials include vegetable-derived (plant-derived) natural carbonaceous materials such as coal, cokes, pitch, bone charcoal, vegetable charcoal, coconut shells/wood, sawdust, and lignin; animal-derived natural carbonaceous materials such as beef bones; organic polymers including synthetic resins such as phenolic resins and polyacrylonitriles; and soot.

Activated carbons for use in the present invention can be either activated carbons themselves or articles partially containing activated carbons. Such activated carbons can be, for example, an activated carbon supported on a support such as a plastic, a mineral, a ceramic, or a fiber; a granulated article (granules) prepared by granulating a powdered activated carbon with a binder; and a granulated article of a powdered activated carbon with a powder typically of a mineral or a ceramic. Some materials such as bone charcoal, vegetable charcoal, graphite, and carbon black may structurally partially contain activated carbons. In this case, these materials can also be used as the articles partially containing activated carbons in the present invention.

The specific surface area of an activated carbon for use in the present invention is not specifically limited, as long as being 500 $m^2/g$ or more, and is preferably 750 $m^2/g$ or more, and more preferably 900 $m^2/g$ or more, with its upper limit generally being about 3000 $m^2/g$.

An activated carbon for use in the present invention can have any shape such as granular, powdery, fibrous, sheet-like, or honeycomb-like shape. Examples of granular activated carbons include products supplied from Calgon Mitsubishi Chemical Corporation (former Toyo Calgon Co., Ltd.) under the trade names of F400, F300, PCB, BPL, CAL, CPG, and APC; products supplied from Japan EnviroChemicals, Ltd. under the trade names of Granular Shirasagi WH and Granular Shirasagi C; a product supplied from Kuraray Chemical Co., Ltd. under the trade name of Kuraraycoal KW; and a product supplied from Kureha Corporation under the trade name of BAC. Examples of powdered activated carbons include products supplied from Japan EnviroChemicals, Ltd. under the trade names of Shirasagi A and Shirasagi C. Examples of fibrous activated carbon include a product supplied from Toho Rayon Co., Ltd. under the trade name of FX-300; a product supplied from Osaka Gas Co., Ltd. under the trade name of M-30; and a product supplied from Toyobo Co., Ltd. under the trade name of KF-1500. Examples of sheet-like activated carbons include a product supplied from Kanebo, Ltd. under the trade name of Microlite AC.

The amount of an activated carbon is not specifically limited but is preferably 0.01 to 10 parts by weight, and more preferably 0.1 to 1 parts by weight, to 100 parts by weight the cyclic compounds (A).

[Active Hydrogen-Containing Compound]

When a cyclic compound (A) for use in the present invention is one having active hydrogen, such as glycidol, ring-opening homopolymerization of glycidol or ring-opening copolymerization of glycidol with another cyclic compound (A) having no active hydrogen can be carried out using hydroxyl group of glycidol as an initiator.

Ring-opening homopolymerization of a cyclic compound (A) and ring-opening copolymerization of a cyclic compound (A) with another cyclic compound (A) can also be carried out using an active hydrogen-containing compound (b) as an initiator. The "active hydrogen-containing compound (b)" refers to, for example, a compound having one or more of hydroxyl group, carboxyl group, amino group and/or thiol group.

Examples of such active hydrogen-containing compounds (b) include water; diols such as ethylene glycol, propylene glycol, butanediol, neopentyl glycol, and hexanediol; ether diols as condensates of these; and trifunctional or higher polyhydroxy compounds such as glycerol, trimethylolethane, trimethylolpropane, pentaerythritol, and dipentaerythritol. Products from glycidol as the cyclic compound (A) and at least one of these compounds as the active hydrogen-containing compound (b) are herein referred to as polyglycidols.

The active hydrogen-containing compounds (b) further include monohydroxy compounds. Among them, aliphatic, alicyclic, or aromatic alcohols having one to thirty carbon atoms are preferred, of which aliphatic alcohols are more preferred. More specific examples thereof include lower alcohols having one or more carbon atoms, and higher alcohols having ten or more carbon atoms. Products from glycidol as a cyclic compound (A) and any of these compounds as an active hydrogen-containing compound (b) are corresponding alcohol esters of polyglycidols. The use of an aliphatic alcohol, for example, as an active hydrogen-containing compound (b) yields a polyglycidol aliphatic alkyl ether.

The active hydrogen-containing compounds (b) also include monocarboxy or polycarboxy compounds. Specific examples of such carboxy compounds include lower aliphatic carboxylic acids such as those ranging from formic acid, acetic acid to decanoic acid, polymerizable unsaturated carboxylic acids such as (meth)acrylic acids, and higher aliphatic carboxylic acids such as those ranging from lauric acid (dodecanoic acid) to stearic acid (octadecanoic acid); aliphatic saturated or polymerizable unsaturated dicarboxylic acids such as maleic acid, succinic acid, and adipic acid; alicyclic dicarboxylic acids such as cyclohexanedicarboxylic acid; aromatic dicarboxylic acids such as phthalic acid and analogues thereof; tricarboxylic acids such as propanetricarboxylic acid, trimellitic acid, and aminotriacetic acid; tetracarboxylic acids such as butanetetracarboxylic acid, pyromellitic acid, and ethylenediaminetetraacetic acid, and other polycarboxylic acids. Products from glycidol and any of these compounds, if used as a cyclic compound (A) and an active hydrogen-containing compound (b), respectively, are corresponding carboxylic acid esters of polyglycidols. The use of an aliphatic carboxylic acid, for example, as an active hydrogen-containing compound (b) yields a polyglycidol aliphatic carboxylic acid ester.

The reaction temperature and reaction time of ring-opening polymerization are not specifically limited. The ring-opening polymerization is carried out at temperatures of, for example, 100° C. to 200° C. preferably for one hour or longer and more preferably for five hours or longer.

A reaction system in ring-opening polymerization contains a cyclic compound as a monomer and an activated carbon as essential components. It may further contain, where necessary, one or more solvents as reaction diluents. Examples of such solvents (reaction diluents) include low molecular weight hydrocarbons such as aliphatic hydrocarbons having about four to about twelve carbon atoms; alicyclic hydrocarbons such as cyclohexane; aromatic hydrocarbons such as toluene; chain ethers such as those ranging from dimethyl ether to ethylene glycol dimethyl ether; halogenated hydrocarbons such as chloroform; ketones such as acetone, methyl ethyl ketone, and cyclohexanone; amides such as N,N-dimethylformamide; and cyclic ethers such as tetrahydrofuran and dioxane.

A reaction may be carried out according to a batch mode, a semibatch mode, or a continuous mode. Reactors for use herein include stirred tank reactors; flow reactors such as packed columns; and fluidized bed reactors. The reaction is preferably carried out according to a procedure, in which an activated carbon as a catalyst is packed in a packed-column reactor to form a catalytic layer, and a cyclic compound (A) alone or a mixture of a cyclic compound (A) and an active hydrogen-containing compound (b) is allowed to pass through the catalytic layer. This procedure not only saves the time and efforts for filtering the catalyst but also enables easy reactivation and drying of a deactivated catalyst by allowing steam to pass through the catalytic layer.

EXAMPLES

The present invention will be further illustrated with reference to several examples and comparative examples below, which, however, are never intended to limit the scope of the present invention. All percentages are by weight, unless otherwise specified.

Example 1

Preparation Example 1 of Polyglycidol

In a 1-liter four-neck flask equipped with a nitrogen inlet tube, a stirrer, a condenser, a temperature controller, and a dropping cylinder were placed 4.0 mol (368.4 g) of glycerol and 4.805 g of an activated carbon (supplied from Japan EnviroChemicals, Ltd. as Shirasagi A), followed by heating to 120° C. Next, while keeping the reaction temperature to 120° C., 8.0 mol (592.6 g) of glycidol was added dropwise over six hours, and the reaction was continued until the oxirane concentration in the reaction system became less than 0.1%. After cooling, the activated carbon was removed from the reaction system through filtration, to yield about 950 g of a reaction product.

The resulting polyglycidol had a color (American Public Health Association (APHA) color index) of 20, an acid value (KOH-mg/g) of 0.20, a moisture content (%) of 0.22, a hydroxyl value (KOH-mg/g) of 1146, and a viscosity (mPa·s, at 40° C.) of 8600.

Example 2

Preparation Example 2 of Polyglycidol

In a 2-liter four-neck flask equipped with a nitrogen inlet tube, a stirrer, a condenser, a temperature controller, and a dropping cylinder were placed 4.4 mol (405.2 g) of glycerol and 10.175 g of an activated carbon (supplied from Japan EnviroChemicals, Ltd. as Shirasagi A), followed by heating to 120° C. Next, while keeping the reaction temperature to 120° C., 22.0 mol (1629.8 g) of glycidol was added dropwise over six hours, and the reaction was continued until the oxirane concentration in the reaction system became less than 0.1%. After cooling, the activated carbon was removed from the reaction system through filtration, to yield about 2000 g of a reaction product.

The resulting polyglycidol had an APHA color index of 15, an acid value (KOH-mg/g) of 0.06, a moisture content (%) of 0.21, a hydroxyl value (KOH-mg/g) of 948, and a viscosity (mPa·s, at 60° C.) of 7100.

Example 3

Preparation Example 1 of Polyglycidol Alkyl Ether

In a 2-liter four-neck flask equipped with a nitrogen inlet tube, a stirrer, a condenser, a temperature controller, and a dropping cylinder were placed 1.0 mol (184.3 g) of lauryl alcohol and 4.065 g of an activated carbon (supplied from Japan EnviroChemicals, Ltd. as Shirasagi A), followed by heating to 120° C. Next, while keeping the reaction temperature to 120° C., 3.0 mol (222.2 g) of glycidol was added dropwise over six hours, and the reaction was continued until the oxirane concentration in the reaction system became less than 0.1%. After cooling, the activated carbon was removed from the reaction system through filtration, to yield about 380 g of a reaction product.

The resulting polyglycidol lauryl ether had an APHA color index of 20, an acid value (KOH-mg/g) of 0.45, a moisture content (%) of 0.013, a hydroxyl value (KOH-mg/g) of 583.0, and a viscosity (mPa·S, at 40° C.) of 15200.

Example 4

Preparation Example 1 of Polyglycidol Alkyl Ester

In a 1-liter four-neck flask equipped with a nitrogen inlet tube, a stirrer, a condenser, a temperature controller, and a dropping cylinder were placed 0.5 mol (100.16 g) of lauric acid and 3.224 g of an activated carbon (supplied from Japan EnviroChemicals, Ltd. as Shirasagi A), followed by heating to 140° C. Next, while keeping the reaction temperature to 140° C., 3.0 mol (222.24 g) of glycidol was added dropwise over five hours, and the reaction was continued until the oxirane concentration in the system became less than 0.1%. After cooling, the activated carbon was removed from the reaction system through filtration, to yield about 300 g of a polyglycidol monolauric ester.

The resulting polyglycidol monolauric ester had an appearance in terms of APHA color index of 20, an acid value (KOH-mg/g) of 2.44, a moisture content (%) of 0.049, a hydroxyl value (KOH-mg/g) of 598.1, a saponification value (KOH-mg/g) of 88.8, and a viscosity (mPa·S, at 40° C.) of 14470.

Example 5

Preparation Example 2 of Polyglycidol Alkyl Ester

In a 1-liter four-neck flask equipped with a nitrogen inlet tube, a stirrer, a condenser, a temperature controller, and a dropping cylinder were placed 0.5 mol (100.16 g) of lauric acid and 4.706 g of an activated carbon (supplied from Japan EnviroChemicals, Ltd. as Shirasagi A), followed by heating to 140° C. Next, while keeping the reaction temperature to 140° C., 5.0 mol (370.40 g) of glycidol was added dropwise over five hours, and the reaction was continued until the oxirane concentration in the system became less than 0.1%. After cooling, the activated carbon was removed from the reaction system through filtration, to yield about 450 g of a polyglycidol monolauric ester.

The resulting polyglycidol monolauric ester had an appearance in terms of APHA color index of 15, an acid value (KOH-mg/g) of 0.32, a moisture content (%) of 0.088, a hydroxyl value (KOH-mg/g) of 639, a saponification value (KOH-mg/g) of 61.1, and a viscosity (mPa·S, at 40° C.) of 44000.

INDUSTRIAL APPLICABILITY

According to the present invention, an activated carbon used as a catalyst is excellent in catalytic activity and reduces side reactions. The catalyst can be easily separated and removed from a target product through filtration, and does not cause deterioration in safety and performance of the target product, in contrast to known catalysts. A process according to the present invention is very excellent as a process for industrially producing ring-opened polymers of cyclic compounds.

The invention claimed is:

1. A process for ring-opening polymerization that proceeds through ring opening of at least one cyclic compound (A) as a monomer, wherein the cyclic compound (A) is glycidol, the process comprising the step of using an activated carbon as the sole ring-opening polymerization catalyst.

2. The process for ring-opening polymerization according to claim 1, further comprising carrying out a reaction of glycidol using an active hydrogen-containing compound (b) as an initiator.

3. The process for ring-opening polymerization according to claim 2, further comprising using water or a polyhydroxy compound as the active hydrogen-containing compound (b) to yield a polyglycidol.

4. The process for ring-opening polymerization according to claim 2, further comprising using an aliphatic alcohol as the active hydrogen-containing compound (b) to yield a polyglycidol aliphatic alkyl ether.

5. The process for ring-opening polymerization according to claim 2, further comprising using an aliphatic carboxylic acid as the active hydrogen-containing compound (b) to yield a polyglycidol aliphatic carboxylic acid ester.

* * * * *